Nov. 15, 1966   J. D. BAILEY   3,284,956
FREIGHT VEHICLE DOOR SEALING ARRANGEMENT
Original Filed March 17, 1961   2 Sheets-Sheet 1

INVENTOR.
JOHN D. BAILEY
BY Wayne Morris Russell
ATTY.

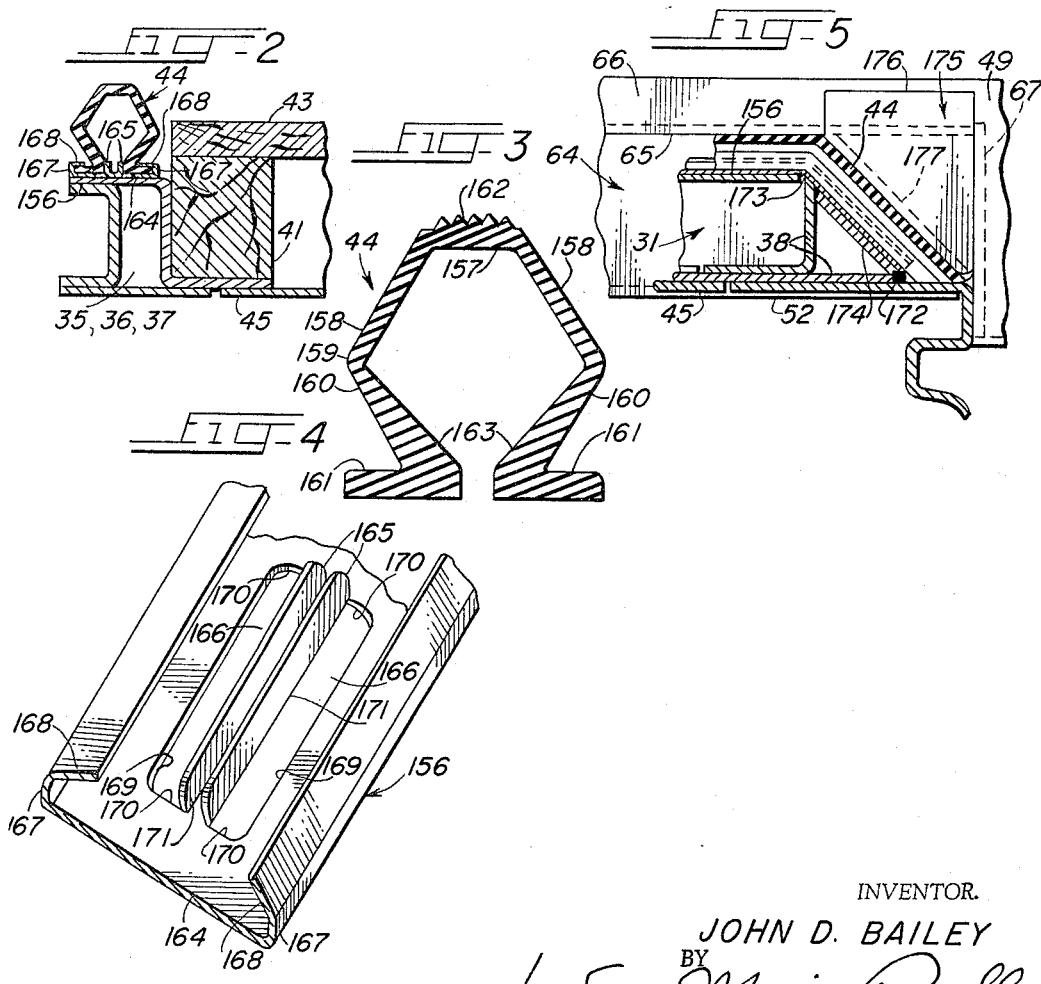

United States Patent Office 3,284,956
Patented Nov. 15, 1966

3,284,956
FREIGHT VEHICLE DOOR SEALING
ARRANGEMENT
John D. Bailey, Chicago, Ill., assignor to Pullman Incorporated, Chicago, Ill., a corporation of Delaware
Original application Mar. 17, 1961, Ser. No. 96,562, now Patent No. 3,179,984, dated Apr. 27, 1965. Divided and this application Feb. 28, 1964, Ser. No. 348,199
1 Claim. (Cl. 49—493)

This invention relates to a sealing arrangement for freight vehicle doors and more particularly for laterally movable doors of freight vehicles.

This application comprises a division of the copending application of John D. Bailey, Serial No. 96,562, filed March 17, 1961 now U.S. Patent 3,179,984, issued April 27, 1965.

It is an object of this invention to provide a sealing arrangement for laterally movable doors of freight vehicles comprising non-metallic flexible sealing members wherein the sealing members shall be so shaped and constructed as to be compressible when acting to seal the doors in closed position and have a high degree of spring back to return to original shape when not compressed thereby to substantially minimize permanent set of the members.

A further object is to provide non-metallic flexible sealing members for laterally movable doors of freight vehicles wherein the members shall embody transversely spaced apart angle shape sides having oppositely directed apexes extending longitudinally to form creasing lines for the members when compressed thereby to substantially retard fatigue and deterioration of the material by repeated flexing.

A further object is to provide a non-metallic flexible sealing member for laterally movable doors of freight vehicles comprising a compressible body which shall be generally tubular shape in cross section and a pair of base flanges extending from the sides of the body and the body having enlarged heel portions where it joins the flanges to provide a high degree of spring back to return the body to its original shape when released from compression.

A further object is to provide a generally channel shape clamping member for securing a pair of transversely spaced apart base flanges of a non-metallic sealing member to the face of a door wherein the clamping member shall be formed from a single piece of material and embody a web portion applied against and secured to the door and pairs of outer and inner flanges extending from the web and the flanges of the sealing member shall be inserted into the clamping member between the respectively opposite outer and inner flanges thereof and the outer flanges having bendable marginal portions which shall be bent over and against the respectively corresponding marginal portions of the flanges of the sealing member to fixedly secure the sealing member flanges to the door.

The foregoing and other objects of the invention are attained by the arrangement illustrated in the accompanying drawings wherein:

FIG. 2 is a sectional view of the edge portions of the laterally movable door of FIG. 1 showing the application of the non-metallic flexible sealing member of this invention;

FIG. 3 is a sectional view of the non-metallic flexible sealing member of this invention to a larger scale to more clearly show the shape and construction of the member;

FIG. 4 is an isometric view of the channel shape bendable retainer clip used for securing the sealing member to the laterally movable door; and FIG. 5 is a horizontal sectional view through the vertical leading edge portion of the laterally movable door of FIG. 1 at the lower corner portion thereof showing the application of the sealing member at this point.

Figure 1:
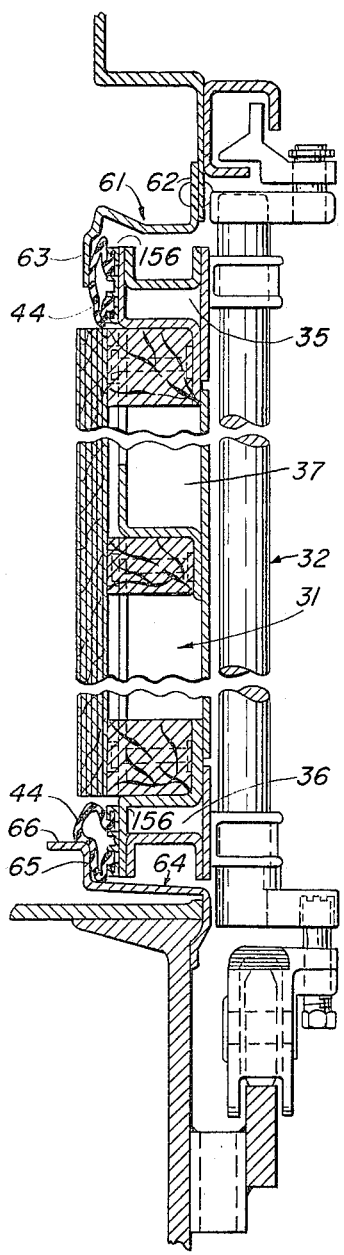
FIG. 1 is a vertical sectional view taken through a laterally movable door of a railway car showing the laterally movable door in closed position within the recessed portion of the side door opening and also showing the non-metallic flexible sealing member of this invention at the top and bottom of the door in compressed sealing position.

The sealing arrangement of this invention is shown with a laterally movable door 31 and functions in conjunction with the operating mechanism 32 and being compressible, it seals the door when the door is in closed position within the door opening. For a more detailed description of the door and operating mechanism reference is made to the aforementioned U.S. Patent 3,179,984. The arrangement comprises a non-metallic flexible sealing member 44 which, as shown in FIG. 1, extends along the top, bottom and trailing edges of the door. As best shown in FIG. 2, sealing member 44 is secured to the inside surfaces of the door framing members 35, 36 and 37 by means of retainer clip 156. As viewed in FIG. 3, the sealing member 44 comprises a flat top sealing portion 157 which is connected at each end to respectively opposite upper side portions 158. The upper side portions 158 each extend outwardly and downwardly from the top sealing portion to juncture points 159 located midway between the top and bottom surfaces of the member. The lower ends of each upper side portion 158 are connected to lower side portions 160, each of which extend inwardly and downwardly therefrom and are connected at their respective lower ends to the outwardly directed attaching base flanges 161. Thus the upper 158 and lower 160 side portions form angular section sides providing oppositely outwardly directed apexes at the juncture points 159. The top portion 157 is preferably formed with a serrated top surface 162 to provide a weathertight and lightproof seal when in contact with the door opening framing members. As clearly illustrated in FIG. 3, the lower side portions 160 are each formed with a thickness varying in size from minimum at juncture point 159 to maximum at lower juncture point 163 to flange 161, thereby providing enlarged heels at the junctures between the sides and the attaching base flanges of the sealing member.

The retainer clip 156 which is used to secure sealing member 44 to the door is illustrated in FIG. 4. The clip is generally channel shape in section, with the web portion 164 serving as the base. A plurality of inner spacer flanges 165 are provided at longitudinally spaced intervals in the web portion 164. The flanges 165 are formed from material obtained by cutting slots 166 in web 164. The slots are formed by first cutting the web material at side 169 and ends 170 and then bending the material upward at 171 to form flange 165. The upper portions 168 of the outer upwardly directed flanges 167 are bent inwardly forming slopping, bendable portions as indicated.

The retainer clip 156 is first applied to the door edge framing members 35, 36 and 37 in the form as shown in FIG. 12 extending substantially for the full length of the members and is secured thereto by welding. The sealing member 44 is then inserted into the retainer clip 156 with flanges 161 fitted in place on respectively opposite sides thereof between the inner flanges 165 and outer flanges 167. The upper sloping portions 168 of flanges 167 are then bent down over the outer portions of flanges 161 to securely hold the sealing member in place, as shown in FIG. 2. This method of securing the sealing member to the door is more feasible and economical than other methods sometimes employed wherein holes are required in the framing members of the door for application of fasteners or wooden strips are provided in the door framing for nailing the sealing members.

From the foregoing, it can be seen that the sealing member 44 is generally of pentagonal shape in section and is applied to the door with the top surface projecting beyond the inside surface of the door so that the member is subjected to considerable deflection when the door is in closed position as clearly shown in FIG. 1. The flat serrated top surface of the members provides a good sealing surface for contact with the metal abutment formed in the framing of the door opening, so that a weathertight and lightproof seal is provided between the door and door opening framework when the door is in closed position. As hereinbefore described and as best shown in FIG. 3 the angular shape sides of the bodies of the members form oppositely directed apexes 159. These apexes extend longitudinally along the sides and fix lines on which the sides fold when the bodies are being compressed during closing operations of the doors as clearly shown in FIG. 1. This formation definitely locating the folding lines of the sides substantially retards fatigue and cracking of the material by repeated flexing thereby prolonging the useful life of the sealing members.

The enlarged heels 163 of the attaching base flanges 161 are deflected during the folding action of the sides and because of their maximum thickness offer resistance to such action. This resistance is increased with increased deflection of the bodies from the pressures imposed during the closing movements of the door into the door pocket. This increased resistance insures that the sealing members will remain in good sealing contact with the door opening framing when the door is in closed position. When the sealing members are relieved from compression, the enlarged heels because of their increased resistance to deflection, spring back quickly to their normal positions and in so doing they also return the other parts of the body to their normal positions whereby the body is returned substantially to its original shape. Thus any tendency of the sealing members to take a permanent set under compression is substantially minimized by the high degree of spring back afforded by the enlarged heels.

As described above, the sealing member 44 is provided along the top, bottom and trailing edges of the door. The trailing ends of the top and bottom members are joined to the respective top and bottom ends of the trailing edge member to form one continuous sealing member extending around the three edges of the door. The top and bottom members terminate at the leading edge of the door as illustrated in FIG. 5. While FIG. 5 is actually a horizontal sectional view through the lower corner portion of door 31 and shows the arrangement of the door and the bottom members 49 and 64 of the door opening at this point, the drawing also applies to the respectively opposite upper corner portion of the door and the header members of the door opening which are similarly arranged so that the end portions of the top and bottom sealing members are applied in the same manner. As indicated, the lower outer portion of the leading edge framing member 38 is coped out horizontally from the vertical leading surface 74 to points 172 and 173 of the outer and inner portions of the member respectively and vertically from the bottom edge of the member to a point above to provide sufficient space for the application of the sealing member 44 and retainer 156. A plate 174 extending between the vertical cutoff points 172 and 173 and the bottom edge of the member to the horizontal cutoff point above is welded in place as indicated. Retainer 156 and sealing member 44 extend around the supporting surface formed by plate 174 with the retainer secured thereto and terminating against the inside surface of the sliding door stop and sealing member 52. A filler member 175 is welded in place in the corner pocket formed by the connecting plate 67 and the vertical portion 65 and lower horizontal portion of the bottom door opening member 64. Filler member 175 is angular in form, having a top horizontal flange 176 and downwardly extending vertical flange 177. Horizontal flange 176 is fitted into a coped-out portion of flange 66 of door opening member 64, so as to be flush with the top surfaces of flanges 66 and 49. The flange 177 is disposed in spaced parallel relationship with plate 174 and being the same height as the vertical portion 65 of the door opening framing member 64 provides a continuing contacting surface for the sealing surface 162 of sealing member 44 when the door is in closed position. Thus a weather-tight and lightproof seal is provided at the top and bottom edges of the door at the leading edge thereof.

What is claimed is:

In a sealing arrangement for a laterally movable door adapted to fit into a vertical freight vehicle door opening having an abutment surface extending continuously along the top, bottom and sides thereof, said arrangement including a sealing member extending about the sides, top and bottom of said door adapted to fit into said door opening, said sealing member comprising a resilient flexible material having a tubular body of generally polygonal contour in cross section, said tubular body including an upper substantially flat side, serrations extending upwardly from said flat side, a pair of outwardly inclined sides of substantially constant thickness extending integrally from the respective ends of said flat side, a pair of inwardly and downwardly inclined sides extending integrally from the respective ends of said outwardly inclined sides, said outwardly inclined sides and said inwardly and downwardly inclined sides being joined to form apices defining longitudinally extending fold lines about which said body is compressed, said inwardly inclined sides each being tapered to a gradually increasing thickness adjacent their other ends which are detached and transversely spaced from each other, and outwardly extending attaching flanges extending from the other ends of the said inwardly inclined sides; and means securing said sealing member to said door in opposing relationship to said abutment surface comprising a strip including a base, a pair of laterally spaced outer flanges along each side of said base and defining clamping grooves into which said laterally extending attaching flanges are clamped, and a pair of upstanding clip members fixed to said base and spaced to engage the inner other ends of said inwardly inclined sides to which said laterally extending attaching flanges are secured.

References Cited by the Examiner

UNITED STATES PATENTS

| | | | |
|---|---|---|---|
| 180,683 | 8/1876 | Watkins | 20—69 |
| 1,728,453 | 9/1929 | Stanton | 20—69 |
| 1,998,791 | 4/1935 | Schanz | 20—69 |
| 2,102,578 | 12/1937 | Gail | 20—69 |
| 2,469,131 | 5/1949 | Ross | 20—69 X |
| 2,736,076 | 2/1956 | Bush et al. | 20—69 |
| 2,762,090 | 9/1956 | Spraragen | 20—69 |
| 2,843,233 | 7/1958 | Walsh | 20—69 X |
| 2,969,252 | 1/1961 | Gruver | 20—69 X |
| 2,993,243 | 7/1961 | Beauchamp | 20—69 |
| 2,997,752 | 8/1961 | Henrikson et al. | 20—23 |

FOREIGN PATENTS 641,145   8/1950   Great Britain.

HARRISON R. MOSELEY, *Primary Examiner.*

REINALDO P. MACHADO, *Examiner.*

W. E. HEATON, P. C. KANNAN, *Assistant Examiners.*